(12) United States Patent
Lavigne

(10) Patent No.: US 12,049,912 B2
(45) Date of Patent: Jul. 30, 2024

(54) CLAMPING DEVICE, KIT AND RELATED METHOD

(71) Applicant: L'Ébéniste JL Inc., Rouyn-Noranda (CA)

(72) Inventor: Jérémie Lavigne, Rouyn-Noranda (CA)

(73) Assignee: L'Ébéniste JL Inc., Rouyn-Noranda (CA)

( * ) Notice: Subject to any disclaimer, the term of this patent is extended or adjusted under 35 U.S.C. 154(b) by 418 days.

(21) Appl. No.: 17/492,314

(22) Filed: Oct. 1, 2021

(65) Prior Publication Data
US 2023/0109383 A1    Apr. 6, 2023

(51) Int. Cl.
*F16B 2/18* (2006.01)

(52) U.S. Cl.
CPC .................................. *F16B 2/185* (2013.01)

(58) Field of Classification Search
CPC ......... B25B 5/003; B25B 5/14; Y10T 408/03; Y10T 408/563; Y10T 408/567; B23B 2247/10; B23B 2247/12; B23B 47/287; B23B 47/288; F16B 2/185
See application file for complete search history.

(56) References Cited

U.S. PATENT DOCUMENTS

| | | | | |
|---|---|---|---|---|
| 3,854,712 A * | 12/1974 | McGee | .................... | B25B 5/003 269/275 |
| 3,914,871 A * | 10/1975 | Wolff | .................... | B23B 47/288 33/562 |
| 4,602,898 A * | 7/1986 | Brown | .................... | B23B 47/288 408/72 R |
| 4,834,593 A * | 5/1989 | Fallon | .................... | B23B 47/288 408/72 R |
| 7,392,589 B2 * | 7/2008 | Friegang | ............. | E04F 21/0069 33/41.6 |
| 2007/0280797 A1* | 12/2007 | McDaniel | ............. | B23B 47/287 408/115 R |
| 2020/0282470 A1* | 9/2020 | Duginske | .................. | B27C 5/04 |

* cited by examiner

*Primary Examiner* — Daniel J Wiley
(74) *Attorney, Agent, or Firm* — Damien Calvet; Gowling WLG (Canada) LLP

(57) ABSTRACT

Device, method and kit, the device comprising a body and a sliding member. The body comprises a sliding channel, a first reference-clipping-surface and a filler-resting-surface. The first reference-clipping-surface and filler-resting-surface are coplanar. The body comprises a filler-clamp. The sliding member slides perpendicularly to the first reference-clipping-surface. The sliding member comprises a second reference-clipping-surface parallel and non-coplanar to the first reference-clipping-surface, a filler-clipping-surface perpendicular to the filler-resting-surface and a reference-clamp. The first and second reference-clipping-surfaces are configured to releasably secure the device onto a reference board when the sliding member slides upon clamping of the reference-clamp and the filler-clipping-surface; and the filler-clamp are configured to releasably secure a filler board onto the filler-resting-surface upon clamping of the filler-clamp. The method comprises clamping at least two devices, clamping a filler board onto the devices and tracing an outline on the clamped filler board. The kit with two or more devices.

13 Claims, 9 Drawing Sheets

CLAMPING DEVICE, KIT AND RELATED METHOD

TECHNICAL FIELD

The present invention relates to a tool and, more particularly, to a clamping device.

BACKGROUND

Installation of cabinets requires adjusting the newly installed elements to existing structures (walls, ceiling, floor). A space may be present by design between the elements and the structure or may be created because of inconsistencies therebetween.

It has been noticed that properly filling the space between the elements and the structure is an error-prone time consuming step.

The inventor has developed a solution that improves the situation described above.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One general aspect is directed to a device comprising a body that includes a sliding channel. At a body-distal-end of the body, the body also provides a first reference-clipping-surface and at a body-proximal-end of the body, a filler-resting-surface. The first reference-clipping-surface and filler-resting-surface are coplanar and on opposite sides of the sliding channel. At the body-proximal-end, the body provides a filler-clamp. The device also includes a sliding member, in the sliding channel, sliding perpendicularly to the first reference-clipping-surface. The sliding member includes, at a member-distal-end, toward the body-distal-end, a second reference-clipping-surface parallel and non-coplanar to the first reference-clipping-surface and at the member-distal-end, towards the body-proximal-end, a filler-clipping-surface perpendicular to the filler-resting-surface. The sliding member also comprises, at a member-proximal-end, a reference-clamp. The first and second reference-clipping-surfaces are configured to releasably secure the device onto a reference board when the sliding member slides upon clamping of the reference-clamp. The filler-clipping-surface and the filler-clamp are configured to releasably secure a filler board onto the filler-resting-surface upon clamping of the filler-clamp.

Implementations of the device may include one or more of the following features. The reference-clamp may be a first toggle clamp and the filler-clamp may be a second toggle clamp. One or more of the first toggle clamp and the second toggle clamp may provide an adjustable rubber pressure tip. The device may include an abutment member for the first toggle clamp, the abutment member transferring pressure exerted by the first toggle clamp to the body when the first toggle clamp is in closed position where a length of the abutment member defines a range of compatible thicknesses for the reference board. The abutment member may be adjustably screwed in the body towards the first toggle clamp. The body may include one or more slot for securing at least a second abutment member having a length different compared to the abutment member. The filler-clamp may be secured, using one or more clamp screw, in a sliding surface of the body extending away from the body towards the member-proximal-end. The device may include one or more slot for securing at least one second clamp screw, the at least one second clamp screw providing a different distance between the slider-clamp and the sliding surface compared to the one or more clamp screw.

One general aspect is directed to a method for marking the filler board to proper dimension for an opening between the reference board and a fixed surface. The method may include measuring a largest gap between the reference board and the fixed surface, clamping at least two devices onto the reference board, clamping a piece of board having a width corresponding to the largest gap onto the filler-resting-surfaces of the at least two devices and, with a block having a width corresponding to a thickness of the reference board, tracing an outline of the fixed surface on the clamped piece of board thereby providing the marked filler board.

Implementations of the method may include removing the marked filler board from the devices, removing the at least two devices from the reference board, cutting the filler board using the outline and attaching the filler board between the reference board and the fixed surface.

One general aspect is directed to a kit comprising at least two devices as defined herein. The devices in the kit may be fixed to be compatible with a limited number thicknesses for the reference board (e.g., one thickness). The kit may further comprise a block having a scriber positioned to correspond to an expected thickness of the reference board. The kit scriber may be a scribing indentation for receiving a marking device and/or a scribing tip. The kit may further comprise a set of instructions corresponding to the method defined herein.

BRIEF DESCRIPTION OF THE DRAWINGS

Further features and exemplary advantages of the present invention will become apparent from the following detailed description, taken in conjunction with the appended drawings, in which.

DETAILED DESCRIPTION

The invention has been developed in the context of finishing steps in the installation of cabinet, for instance, in a kitchen or a bathroom. More specifically, it has been noticed that preparing filler boards (e.g., cabinet toe kicks, cover panel or panel filler, etc.) was time consuming and error prone. Typically, it involved taking multiple measurements between a cabinet and a fixed surface between which a gap needs to be filled by a filler board. The measurements are then reported on the raw filler board and the reported measurements are then linked to provide a marked filler board, which may then be cut for installation.

Figure 1:
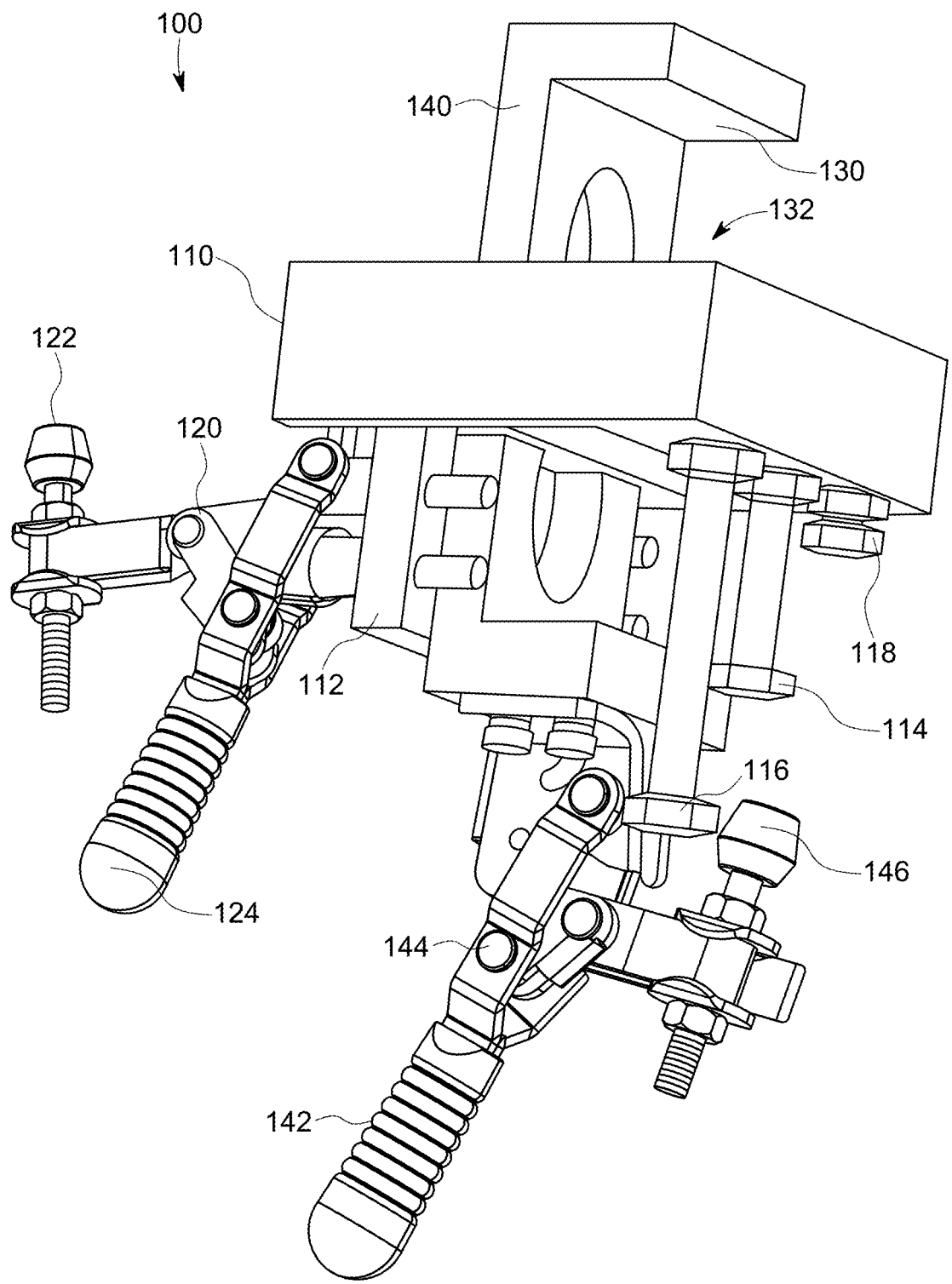
FIG. 1 is a first perspective view of an exemplary device in accordance with the teachings of the present invention.
Figure 2:
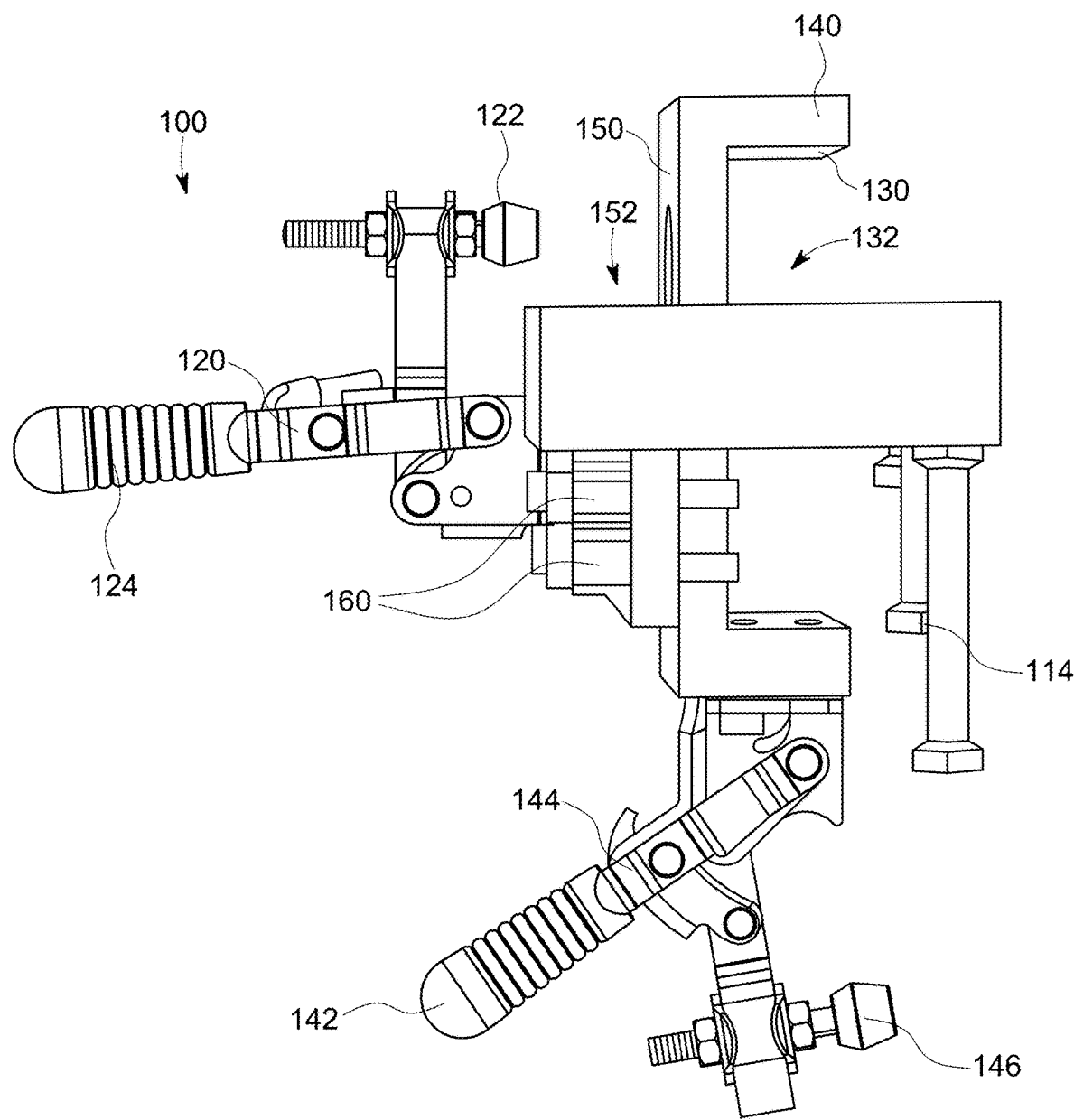
FIG. 2 is a second perspective view of the exemplary device in accordance with the teachings of the present invention.
Figure 3:
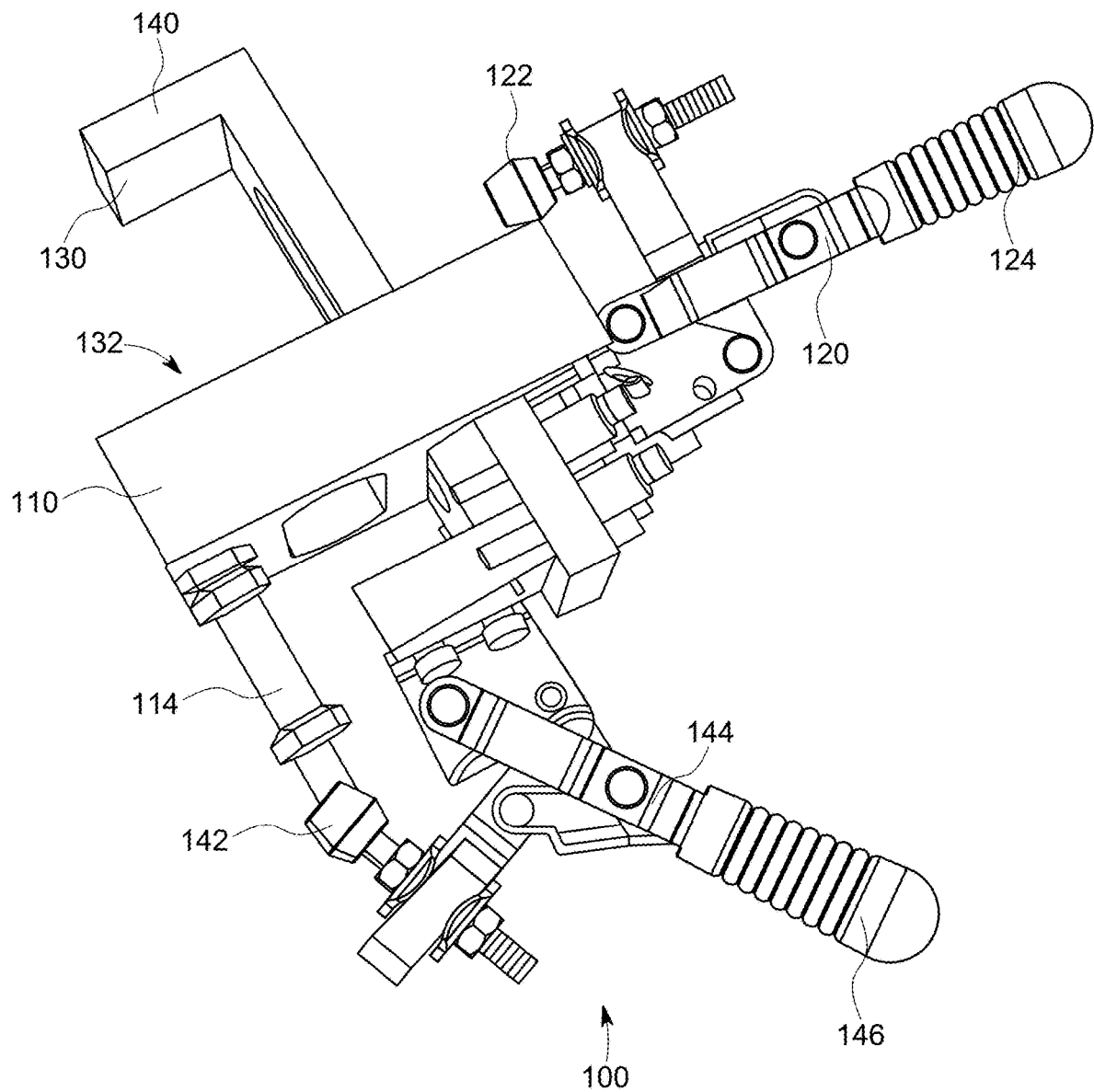
FIG. 3 is a third perspective view of the exemplary device in accordance with the teachings of the present invention.
Figure 4:
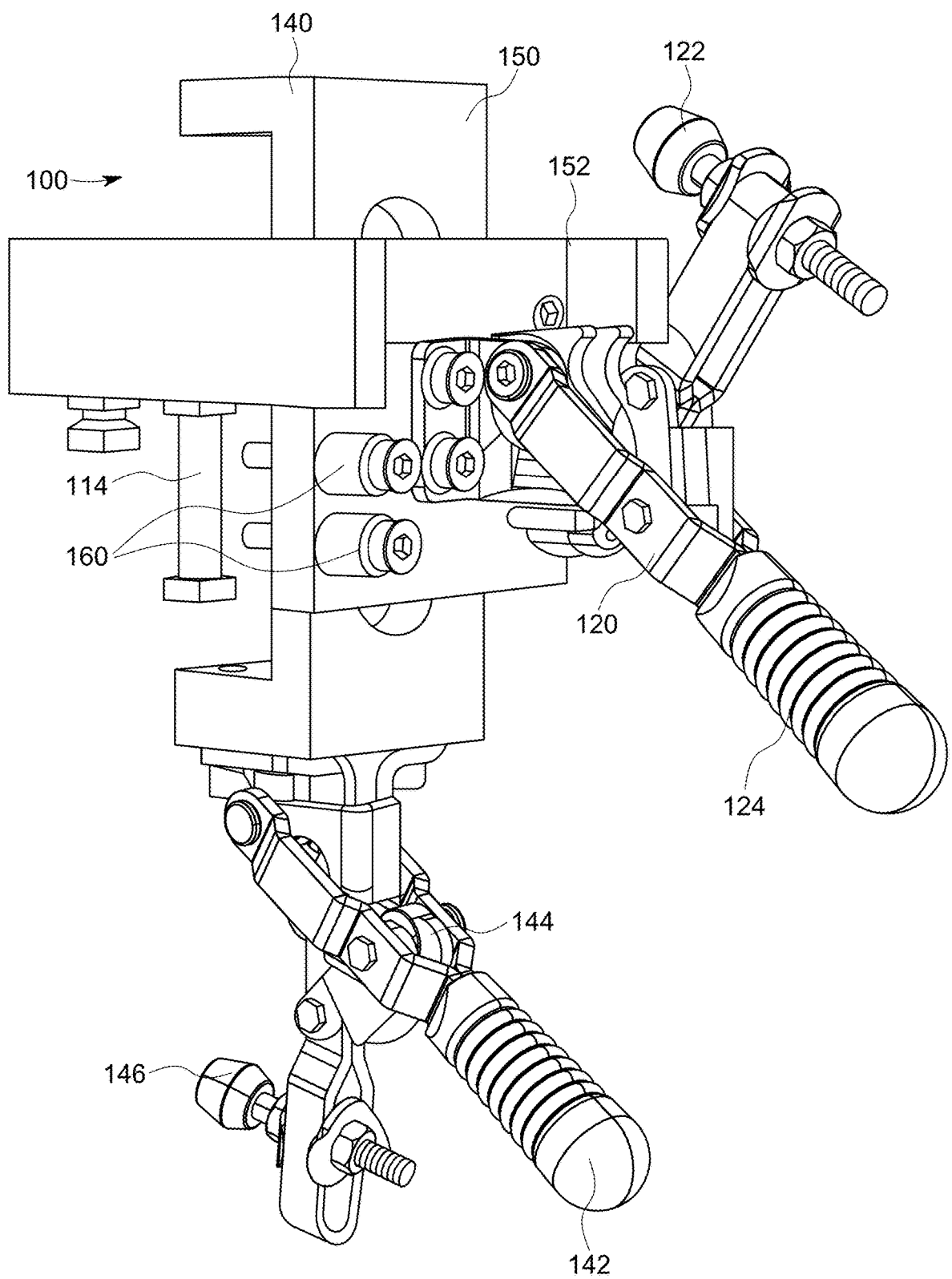
FIG. 4 is a fourth perspective view of the exemplary device in accordance with the teachings of the present invention.
Figure 5:
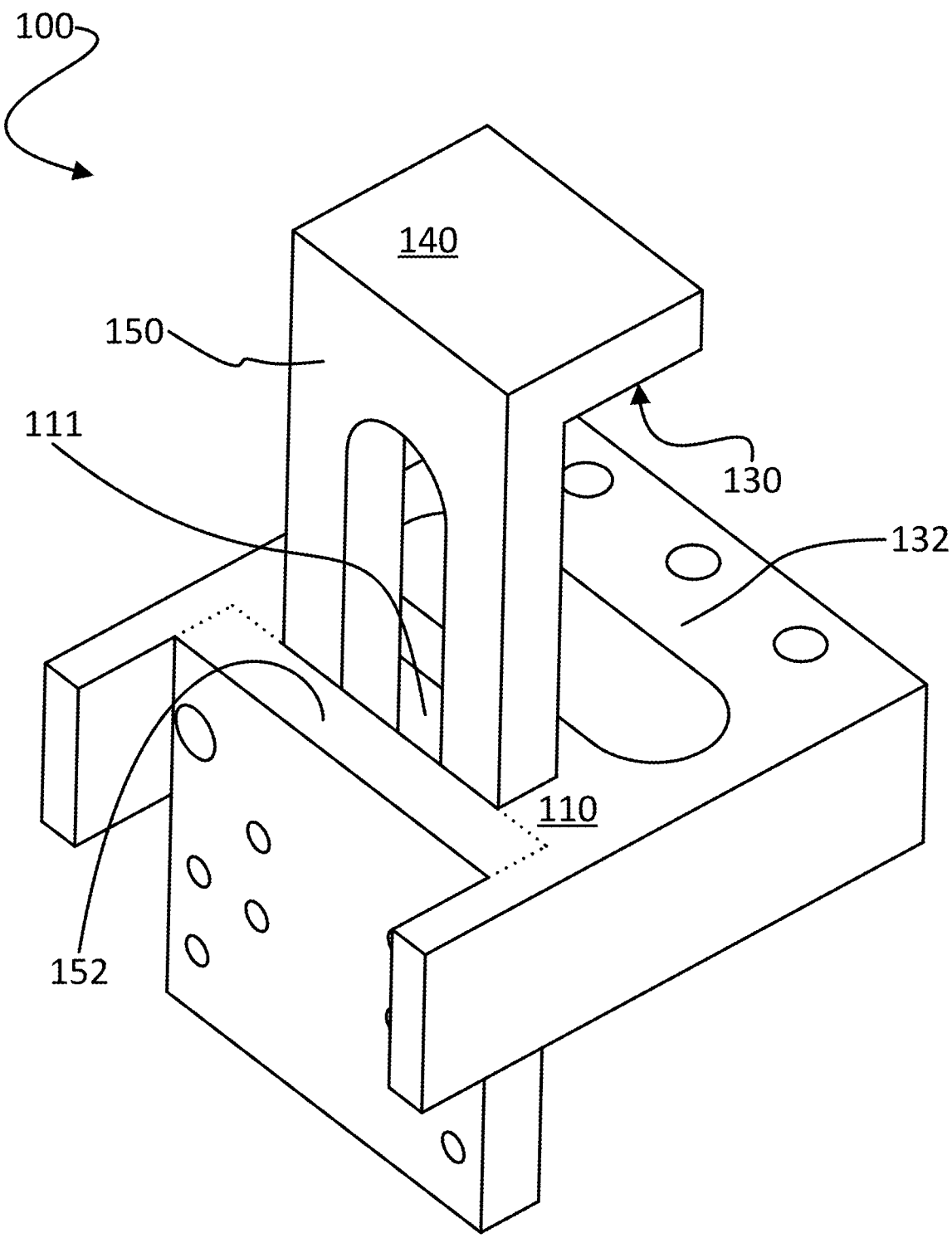
FIG. 5 is a perspective view of exemplary components of a device in accordance with the teachings of the present invention.
Figure 6:
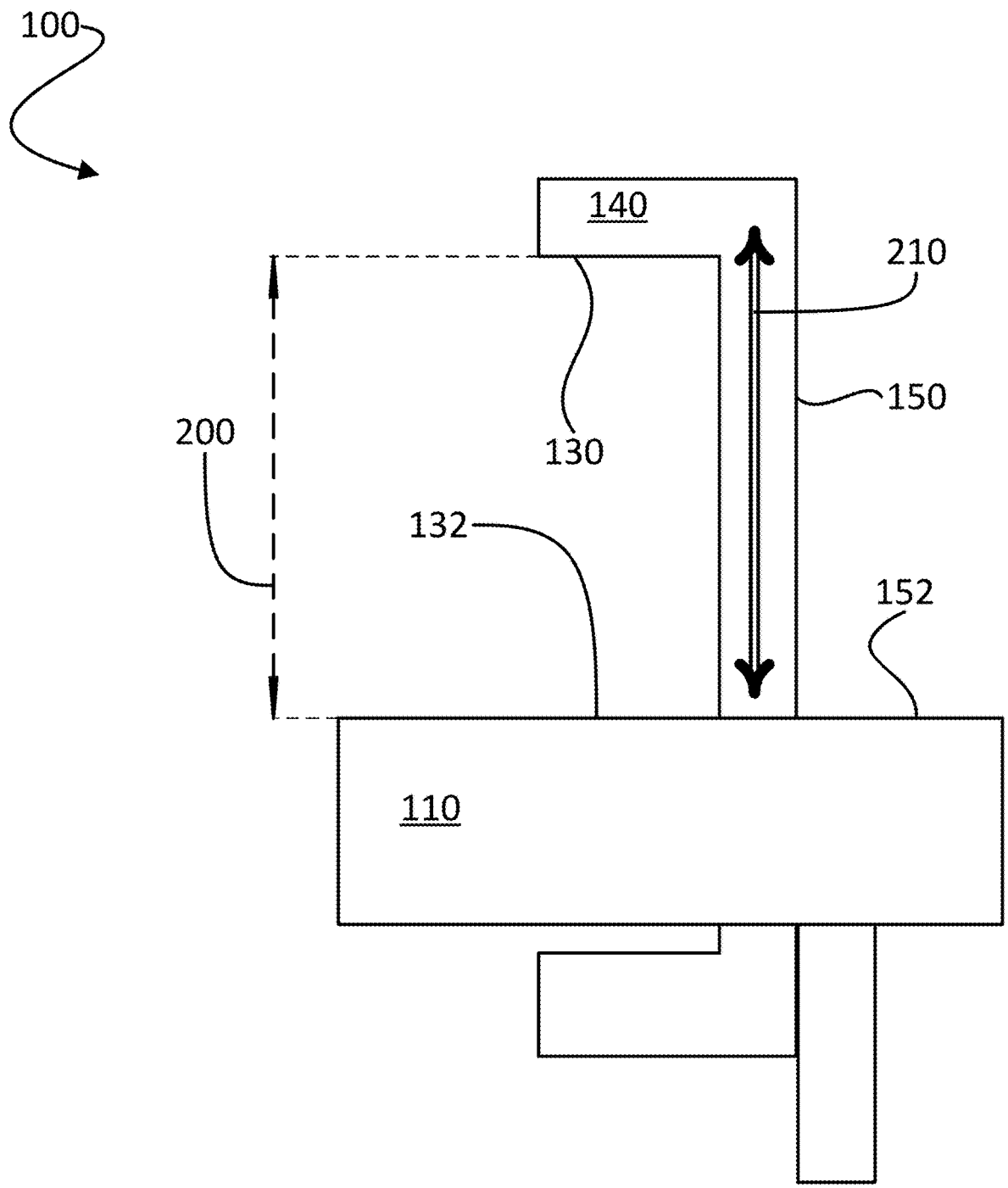
FIG. 6 is a side view of the exemplary component of the device in accordance with the teachings of the present invention.
Figure 7:
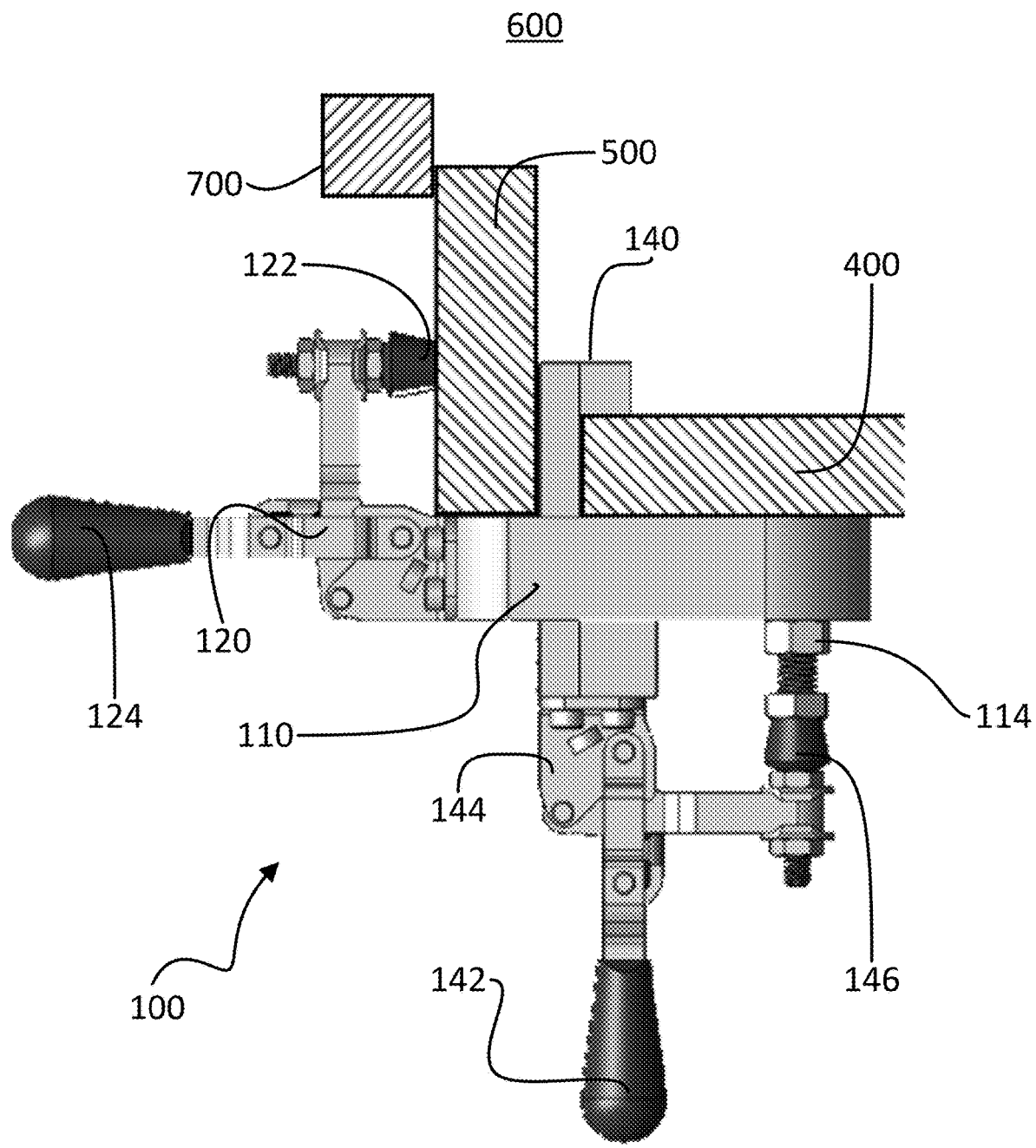
FIG. 7 is a side view of an exemplary device in accordance with the teachings of the present invention.
Figure 8:
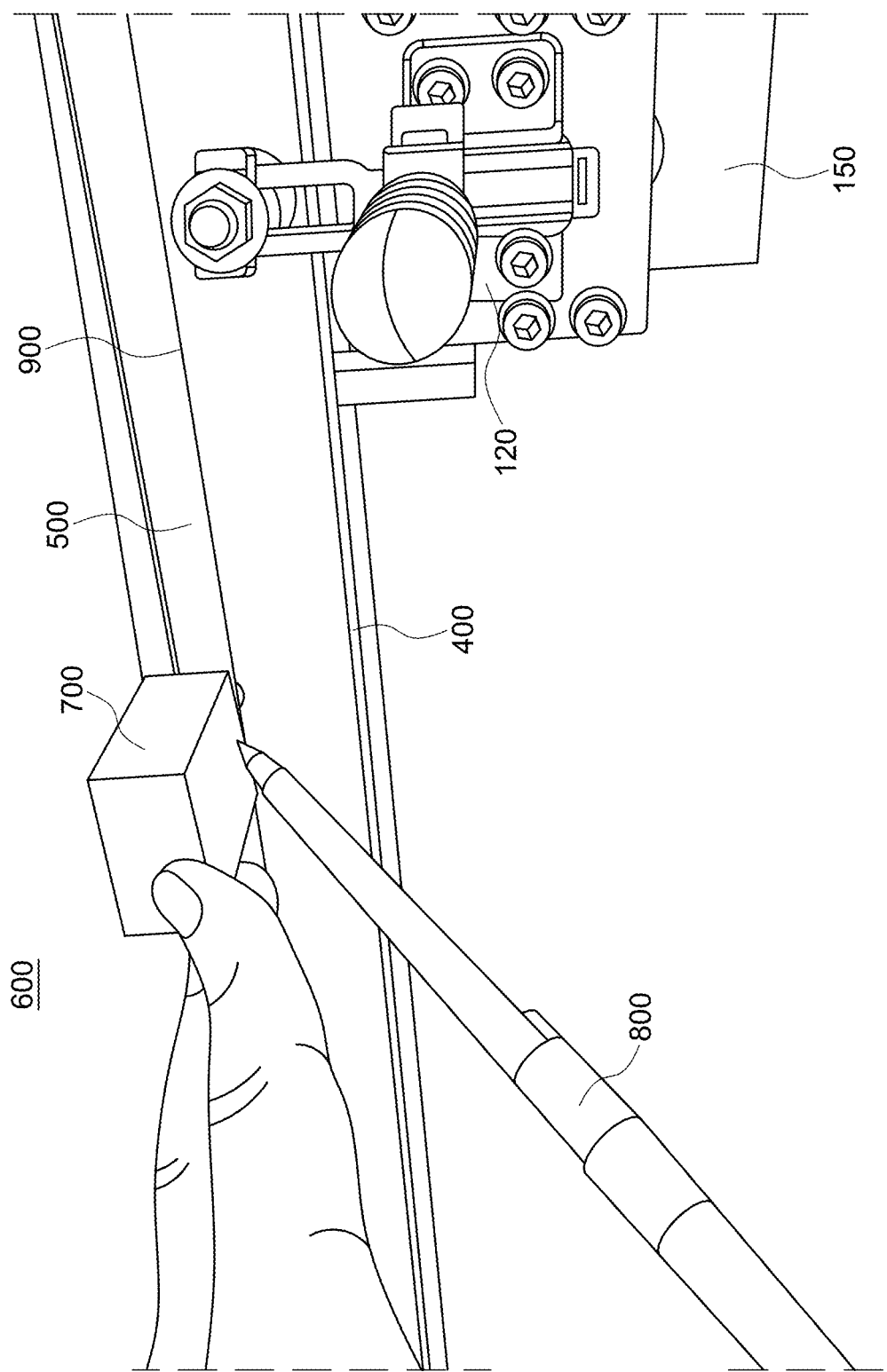
FIG. 8 is a photography of an exemplary use of an exemplary device in accordance with the teachings of the present invention.
Figure 9:
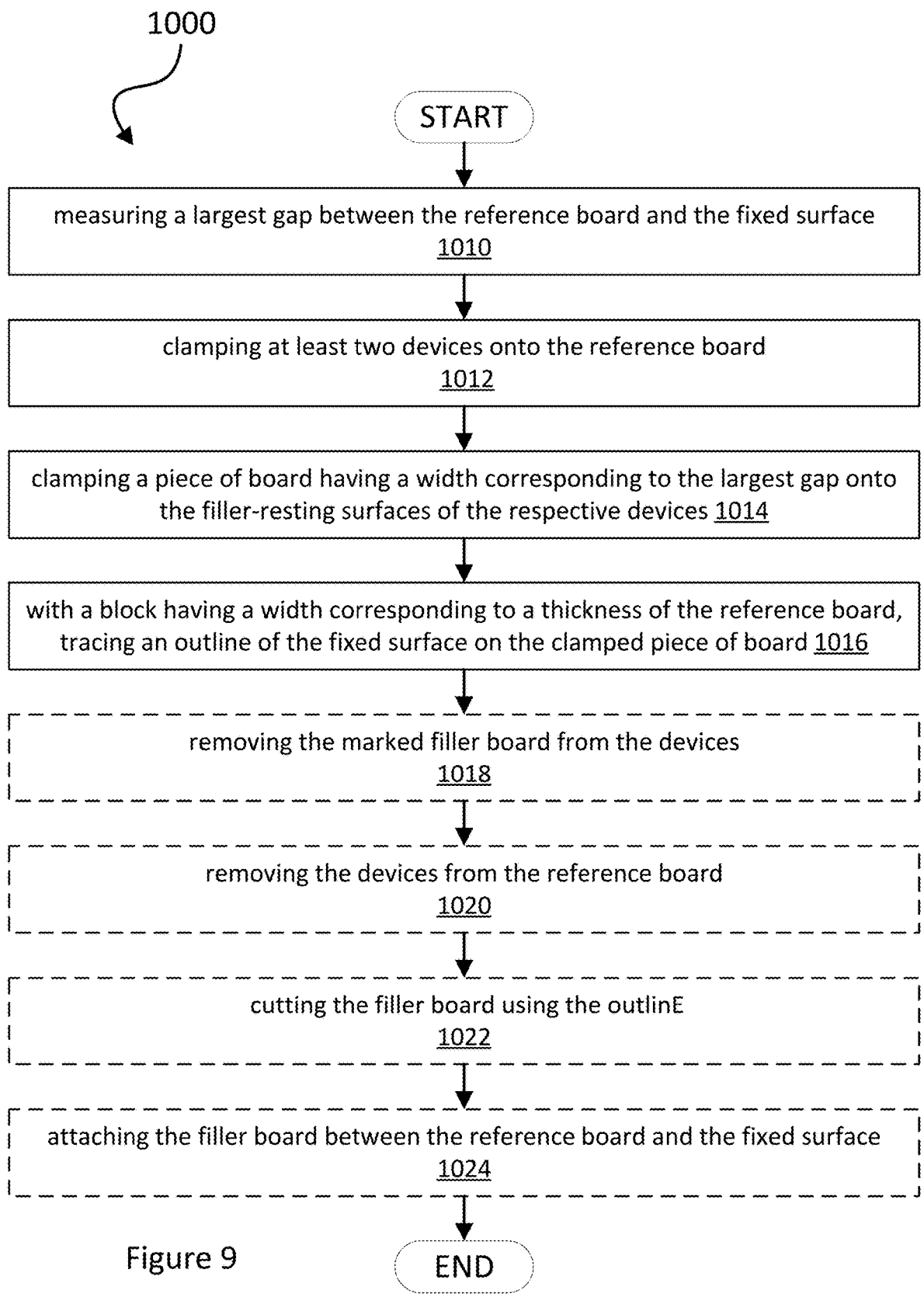
FIG. 9 is a flow chart of a method in accordance with the teachings of the present invention.

Reference is now concurrently made to FIGS. 1 to 8 of the drawing where FIGS. 1-4 depicts a device 100 under different perspective views, FIGS. 5 and 6 depicts exemplary components of the device 100 under a perspective view and a side view and FIG. 7 depicts an additional side view of the device 100. FIG. 8 provides a photography of an exemplary use of the device 100. As will be appreciated through the following description, the device 100 provides a reference point between a fixed surface 600 and a reference board 400 (e.g., a cabinet). The reference point itself may be helpful (e.g., easing and increasing precision of measurements). When multiple devices 100 are used together, it becomes possible to draw a reference line 900 without necessarily taking measurements between the fixed surface and the reference board, as will be appreciated from the following description.

The device 100 comprises a body 110 and a sliding member 140. The body 110 provides a sliding channel 111 in which the sliding member 140 slides along an axis 210. The axis 210 is generally perpendicular to the body 110. A clamp 120 is provided with the body 110 at or near a proximal end thereof or body-proximal-end (e.g., a toggle clamp screwed into the body 110). The clamp 120 is referred to as the filler-clamp 120. The body 110 provides a filler-resting-surface 152 at the body-proximal-end. The body 110 provides a reference-clipping-surface 132 at a distal end of the body or body-distal-end.

The sliding member 140 provided a reference-clipping-surface 130 at a distal end thereof or member-distal-end. The reference-clipping-surface 132 at the body-distal-end is referred to as the first reference-clipping-surface 132 and the reference-clipping-surface 130 at the member-distal-end is referred to as the second reference-clipping-surface 130. The first and second reference-clipping-surface 130, 132 are parallel, which should be readily understood by skilled person in the present context as being sufficiently parallel for properly engaging a reference board 400 placed therebetween. The sliding member 140 also provides at the member-distal-end, towards the body-proximal-end, a filler-clipping-surface 150 perpendicular to the filler-resting-surface 152. Perpendicularity between the filler-clipping-surface 150 and the filler-resting-surface 152 should be readily understood by skilled person in the present context as being sufficiently perpendicular for properly engaging a filler board 500 placed thereupon. A clamp 144 is provided at or near a member-proximal-end of the sliding member 140. The clamp 144 is referred to as the reference-clamp 144.

The first and second reference-clipping-surfaces 130, 132 are configured to releasably secure the device 100 onto a reference board 400 when the sliding member 140 slides upon clamping of the reference-clamp 144. The filler-clipping-surface 150 and the filler-clamp 120 are configured to releasably secure a filler board 500 onto the filler-resting-surface 152 upon clamping of the filler-clamp 120.

As can be appreciated from the figures, the second reference-clipping-surface 132 and filler-resting-surface 152 are coplanar and on opposite sides of the sliding channel 111. The coplanar attribute allows the distance between the fixed surface 600 and the filler-resting-surface 152 to match the distance between the fixed surface 600 and the reference board 400 to which thickness of the reference board 400 is added. As such, when a block 700 is pressed against the fixed surface 600, the distance between the block 700 and the filler-resting-surface 152 matches the distance between the fixed surface 600 and the reference board 400. The block 700 could be a piece of board equivalent to the reference board 400 or any other solid element of the proper thickness. For instance, a block 700 (e.g., made of thermoplastics) having a scribing indentation (e.g., hole) for receiving a pen or a pencil 800 or a scribing tip positioned to correspond to one ore more expected or usual thickness of the reference board 400 may be provided with the device 100.

As exemplified on the set of drawings, the filler-clamp 120 and the reference-clamp 144 may be toggle clamps 120, 144 respectively secured (e.g., screwed) to the sliding member 140 and the body 110. Both or at least one of the toggle clamps 120, 144 may provide an adjustable rubber pressure tip 122, 146.

The device 100 may provide an abutment member 114 for the reference-clamp. The abutment member 114 transfers pressure exerted by the reference-clamp 144 to the body 110 when the reference-clamp 144 is in closed position. A length of the abutment member 114 defines a range of compatible thicknesses 200 for the reference board 400. The abutment member 114 may be screwed into the body 110. The body may also comprise one or more slots for securing one or more additional abutment members 116, 118 having different lengths compared to the abutment member 114, thereby further increasing the range of compatible thicknesses 200 for the reference board 400.

As exemplified, the filler-clamp 120 may be secured, using one or more clamp screw, in a sliding surface 112 of the body 110 extending away from the body 110 towards the member-proximal-end. The device 110 may further comprise one or more slot for securing at least one second clamp screw 160. The second clamp screw(s) 160 provide a different distance between the filler-clamp 120 and the sliding surface 112 compared to the one or more clamp screw.

As will be readily understood by skilled persons, the body 110 and the sliding member 140 may be provided in different materials, and both 110 and 140 do not have to be provided in the same material. Exemplary material for the body 110 and the sliding member 140 include cast iron or other alloys, including aluminum alloys and thermoplastics.

Similarly, other types of clamps may be provided instead of the depicted toggle clamps 120, 144. For instance, C-clamps (or G-clamps) may replace one or both of the toggle clamps. Likewise, the clamps themselves may be provided together with the body 110 or sliding member 140 (e.g., monostructure with clamping mechanism completely or partially integrated therein). Exemplary material for the clamps include cold rolled carbon steel (e.g., with galvanized coating), cast iron or other alloys, including aluminum alloys thermoplastics.

The depicted clamps 120, 144 provide a manual hold down quick-release mechanism with levers 124, 142 in vinyl colored grip e.g., for easy identification and comfort. In some embodiments, different colors are provided for the two grips over the levers 124, 142, allowing, e.g., for simplified instruction manuals to be provided with the device 100. As skilled persons readily understand, toggle clamps secure a work piece (e.g., reference board 400 and/or filler board 500) with a light throw of the lever 124, 142 and provides adjustable rubber pressure tips 122, 146 and comfortable rubber handles over the lever 124, 142. The toggle clamps 120, 144 use an over-center toggle mechanism.

Reference is now made to FIG. 8, which depicts a flow chart of a method 1000 for marking a filler board 500 to proper dimension for an opening between a reference board 400 and a fixed surface 600. The method comprises measuring 1010 a largest gap between the reference board 400 and the fixed surface 600 and clamping 1012 at least two devices as defined hereinabove with reference to FIGS. 1 to 8 onto the reference board 400. The method 1000 also comprises clamping 1014 a piece of board 500 having a width corresponding to the largest gap onto filler-resting surfaces of the devices. With a block 700 having a thickness corresponding to a thickness of the reference board 400, tracing 1016 an outline 900 of the fixed surface 600 on the clamped piece of board 500 is performed, thereby providing the marked filler board 500.

Optionally, when the method 1000 is performed not only to provide a marked filler board 500, but also for instance thereof, the method then further comprises removing 1018 the marked filler board 500 from the devices and removing 1020 the devices from the reference board 400. The method 1000 also then comprises cutting 1022 the filler board 500 using the outline 900 before attaching 1024 the filler board 500 between the reference board 400 and the fixed surface 600. While a single device may still be useful and may achieve proper holding of the filler board, two devices ensure better fit between the reference board 400 and the fixed surface 600. Of course, skilled persons will understand that precision of the outline 900 typically increases when using three (3) or more devices.

A kit may be provided with at least two of the devices 100. The kit may comprise instructions corresponding to the method 1000 described hereinabove. The devices 100 in the kit may be fixed or pre-configured to an expected thickness of the reference board 400. A block 700 corresponding to the expected thickness of the reference board 400 may also be provided in the kit. The block 700 may provide a scriber positioned to correspond to the expected thickness of the reference board 400). The scriber may be a scribing indentation (e.g., hole) for receiving a marking device such as a pen or a pencil 800, or a scribing tip.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A device comprising:
   a body comprising:
      a sliding channel;
      at a body-distal-end of the body, a first reference-clipping-surface;
      at a body-proximal-end of the body, a filler-resting-surface, the first reference-clipping-surface and filler-resting-surface being coplanar and on opposite sides of the sliding channel; and
      at the body-proximal-end, a filler-clamp; and
   a sliding member, in the sliding channel, sliding perpendicularly to the first reference-clipping-surface comprising:
      at a member-distal-end, toward the body-distal-end, a second reference-clipping-surface parallel and non-coplanar to the first reference-clipping-surface;
      at the member-distal-end, towards the body-proximal-end, a filler-clipping-surface perpendicular to the filler-resting-surface; and
      at a member-proximal-end, a reference-clamp;
   wherein the first and second reference-clipping-surfaces are configured to releasably secure the device onto a reference board when the sliding member slides upon clamping of the reference-clamp; and
   wherein the filler-clipping-surface and the filler-clamp are configured to releasably secure a filler board onto the filler-resting-surface upon clamping of the filler-clamp.

2. The device of claim 1, wherein the reference-clamp is a first toggle clamp and the filler-clamp is a second toggle clamp.

3. The device of claim 2, wherein one or more of the first toggle clamp and the second toggle clamp provides an adjustable rubber pressure tip.

4. The device of claim 2, further comprising an abutment member for the first toggle clamp, the abutment member transferring pressure exerted by the first toggle clamp to the body when the first toggle clamp is in closed position whereby a length of the abutment member defines a range of compatible thicknesses for the reference board.

5. The device of claim 4 wherein the abutment member is adjustably screwed in the body towards the first toggle clamp.

6. The device of claim 5, wherein the body comprises one or more slot for securing at least a second abutment member having a length different compared to the abutment member.

7. The device of claim 1, wherein the filler-clamp is secured, using one or more clamp screw, in a sliding surface of the body extending away from the body towards the member-proximal-end.

8. The device of claim 7, further comprising one or more slot for securing at least one second clamp screw, the at least one second clamp screw providing a different distance between the filler-clamp and the sliding surface compared to the one or more clamp screw.

9. A kit comprising at least two devices, each of the devices comprising:
   a body comprising:
      a sliding channel;
      at a body-distal-end of the body, a first reference-clipping-surface;
      at a body-proximal-end of the body, a filler-resting-surface, the first reference-clipping-surface and filler-resting-surface being coplanar and on opposite sides of the sliding channel; and
      at the body-proximal-end, a filler-clamp; and
   a sliding member, in the sliding channel, sliding perpendicularly to the first reference-clipping-surface comprising:
      at a member-distal-end, toward the body-distal-end, a second reference-clipping-surface parallel and non-coplanar to the first reference-clipping-surface;
      at the member-distal-end, towards the body-proximal-end, a filler-clipping-surface perpendicular to the filler-resting-surface; and
      at a member-proximal-end, a reference-clamp.

10. The kit of claim 9 wherein the devices are fixed to be compatible with a limited number thicknesses for a reference board.

11. The kit of claim 10 wherein the limited number is one.

12. The kit of claim 9 further comprising a block having a scriber positioned to correspond to an expected thickness of the reference board.

13. The kit of claim 12 wherein the scriber is a scribing indentation for receiving a marking device.

* * * * *